Jan. 4, 1944.　　　　H. L. GRISWOLD　　　　2,338,506
APPARATUS FOR GENERATING GASES
Filed Dec. 30, 1940　　　4 Sheets-Sheet 1

INVENTOR.
HOWARD L. GRISWOLD.
BY
*Fay, Macklin, Golrick and Williams*
ATTORNEYS.

Jan. 4, 1944. H. L. GRISWOLD 2,338,506
APPARATUS FOR GENERATING GASES
Filed Dec. 30, 1940 4 Sheets-Sheet 2

INVENTOR.
HOWARD L. GRISWOLD.
BY
Fay, Macklin, Golrick and Williams.
ATTORNEYS.

Jan. 4, 1944. H. L. GRISWOLD 2,338,506
APPARATUS FOR GENERATING GASES
Filed Dec. 30, 1940 4 Sheets-Sheet 4

INVENTOR.
HOWARD L. GRISWOLD.
BY
Fay, Macklin, Golrick and Williams
ATTORNEYS.

Patented Jan. 4, 1944

2,338,506

UNITED STATES PATENT OFFICE 2,338,506

APPARATUS FOR GENERATING GASES

Howard L. Griswold, Santa Cruz, Calif., assignor to Coast Reduction, Inc.

Application December 30, 1940, Serial No. 372,228

5 Claims. (Cl. 48—65)

This invention relates, as indicated, to apparatus for generating gases.

In the copending application of Arthur T. Cape and Charles V. Foerster, Serial No. 369,126 there is described a method of preparing carbon monoxide and hydrogen from mixtures of natural gas and air, in which the gas and air are separately preheated and passed through an electrically heated catalyst, such as coke or graphite which has been dipped in a solution of nickel nitrate, dried and ignited. By electrically heating the coke or graphite, sufficient heat is made available to raise the temperature of the exit gases to 2032° F. a temperature which has been found advisable for satisfactory and economical reduction of ores.

In generators which have heretofore been used for the conversion or generation of gases, it has been customary to supply the current for the electrical heating of the bed of coke or graphite by means of electrodes, one or two electrodes being disposed at the bottom of the generator and another electrode projecting into the generator from the top and making contact with the upper surface of the bed. This arrangement has the great disadvantage that the upper electrode is in the stream of generated gas, and since the electrode is a good heat conductor, it carries away by conduction a considerable quantity of heat.

A primary object of the invention, accordingly, is to provide a generator having the electrodes arranged outside the stream of generated gas, whereby waste of heat by conduction of heat of the generated gases to the electrodes is avoided.

Another object of the invention is to provide a generator in which the electrodes are arranged in such a manner that the path between the electrodes through the bed of coke or graphite is shorter at the bottom of the carburetor than at the top of the generator, whereby the cooling effect of the relatively colder gases which are being introduced at the bottom of the generator, and which renders the lower portion of the coke or graphite column less conductive than the upper portion is compensated for by the decrease in the path through which the current travels at the lower portion of the column.

A further object of the invention is to provide heat exchanging means whereby some of the natural gas which is used for mixing with the air is preheated by the heat of the electrodes, and the electrodes, at the same time, are cooled in a desired manner.

Other objects and advantages of the invention will be apparent during the course of the following description.

In the accompanying drawings, forming a part of this specification, and in which like numerals are employed to designate like parts throughout the same, Fig. 1 is a view, partly in front elevation and partly in section of a generator embodying the principal features of the invention;

Figure 1:
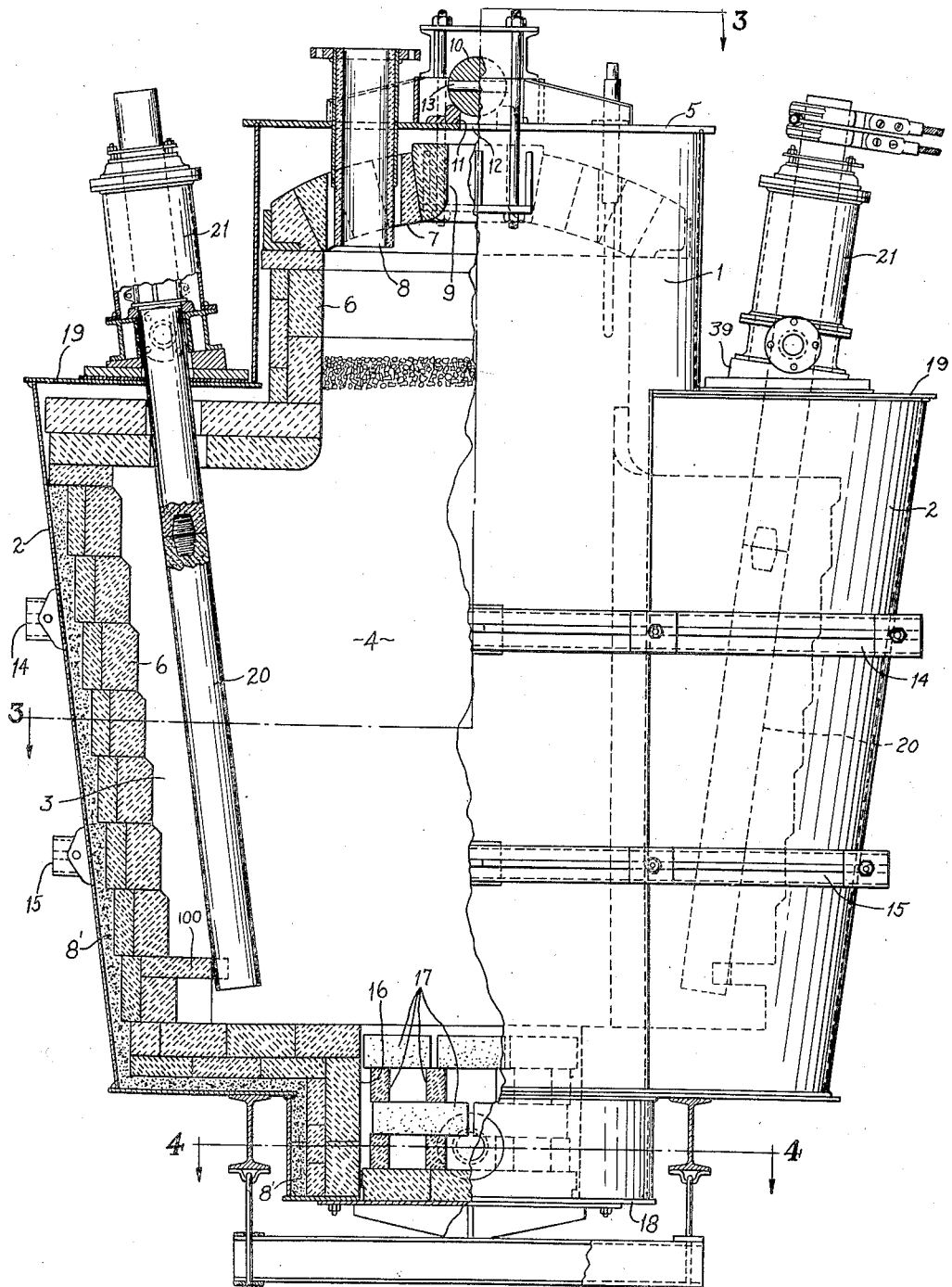

In the drawings, wherein for the purpose of illustration, is shown a preferred embodiment of my invention, the generator comprises a central vertically extending cylindrical body porton 1 formed of sheet steel or the like, and wing portions 2 of generally semi-cylindrical form, likewise formed of sheet metal or the like, and defining electrode chambers 3 which are in open communication with the gas reaction chamber 4 defined by the body 1 of the generator. The chambers 3 diminish in transverse cross-section from top to bottom thereof, and terminate short of the upper as well as lower end of the body portion 1 of the generator. The body 1 of the generator has mounted on its upper end a cap plate 5.

The body 1 and chambers 2 are lined with refractory brick 6, and the portion of the lining within the upper end of the body 1 is surmounted by a dome-shaped cap 7, likewise made of refractory material. A gas outlet 8 extends through the cap plate 5 and the cap 7.

The space between the outer walls and the refractory lining of the gas and electrode chambers is preferably filled with a tamped-in heat insulating material 8'.

The cap 7 has a central opening 9 for permitting access to the gas chamber, but access to this opening is normally closed by means of a ball seal 10 which rests on a ring 11, the opening through which communicates with an opening 12 in the cap plate 5, and which, in turn, communicates with the opening 9. The ball 10 has an opening 13 extending diametrically therethrough which opening may be aligned with the openings 9 and 11 for permitting access to the gas chamber.

The steel shells 1 and 2 are maintained in assembled relation by means of stays 14 and 15. Furthermore, stays are provided, as shown, on the top and bottom plates.

Figure 2:
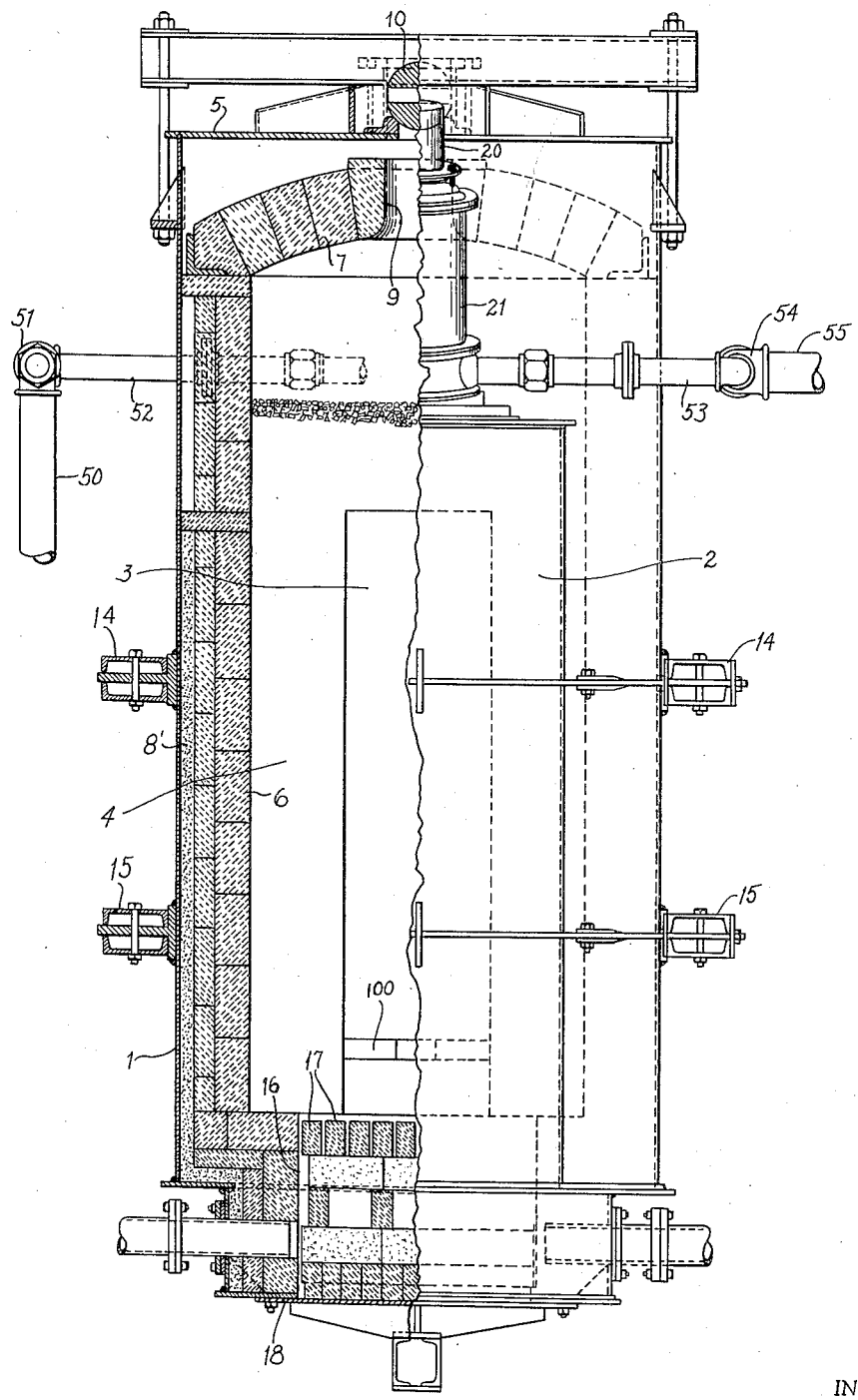
Fig. 2 is a view, partly in side elevation and partly in section of the generator.

The lower end of the body portion 1 of the generator defines a circular or mixing chamber opening 16, filled with checkered brickwork 17 for a purpose to be presently described. This brickwork is supported by a bottom closure plate 18, which is mounted in position by suitable means as shown in Figs. 1 and 2.

The shells 2 are surmounted by plates 19 which have openings therein through which electrodes 20 extend. The electrodes 20 which are formed of graphite extend through openings in the lining 6 and into the chambers 3 and are inclined in such a manner that their lower ends are closer to each other than their upper portions. The upper portions of the electrodes 20 extend through cylindrical steel casings 21 which rest on cast metal tuyères consisting of spaced inner and outer walls 22 and 23 respectively, the inner wall being disposed closely adjacent the electrodes and surrounding the latter. The walls 22 and 23 define a circular chamber divided into two parts 24 and 25 by radially extending partitions 26.

The walls 22 and 23 of the tuyères are connected at their upper ends by a web 27 having a multiplicity of circumferentially-spaced openings 28 therein, which are in communication with the semi-circular tuyère chambers 24 and 25.

The webs 27 of the tuyères are provided with elements 29 which form sockets for ball elements 30 which surround and closely fit the electrodes, the electrodes, thus being supported through ball and socket joints, which permit sufficient movement of the electrodes to compensate for strains and prevent breakage thereof.

The portions of the electrodes 20 above the ball elements 30, and which are confined within the casing 21, have clamped thereto cast metal clamps 31 and 32, the clamps 32 having flanges 33 which extend into diametrically opposite channels 34 secured to the inner walls of the casings 21, and which flanges serve to direct the flow of gas in a manner to be presently described. The clamps 31 and 32 are provided with spaced heat-exchanging ribs or fins 35, which are used in a manner to be presently described.

The casings 21 are surmounted by plates 36, preferably formed of an electrical insulating, heat-resisting material, such as "Transite," "Molded asbestos" or "Asbestos ebony," and having central openings through which the electrodes extend. Leakage of gases through the space between the electrodes and the plates 36 is prevented by means of water-cooled packing boxes 37 which rest on the plates. Secured to the upper ends of the electrodes 20 are water-cooled electrode clamps 38, by means of which current is supplied to the electrodes.

The inclined position of the electrodes is attained through the use of wedge-shaped plates 39 upon which the tuyères are supported, these wedge-shaped plates having openings therein through which the electrodes pass, and being rigidly secured in position with respect to the generator by means of screws 40 which extend through plates 41, preferably formed of the same material as the plates 36, and which in turn, are rigidly secured to the plates 19 by means of screws 42. A gasket 43, formed of sheet asbestos, molded mica, or other similar material having electrical insulating properties, is interposed between the plate 19 and the plate 41.

The plates 36 are desirable in preventing the direct withdrawal of heat from the heat exchanging cylinder 21 to the cooling water of the packing boxes 37, and the plates 41 are absolutely necessary for electrical insulating purposes, without which the generator could not be operated. This applies also to the elements 52 and 53 (Fig. 2) which are of an insulating character.

Each of the tuyères is provided with an inlet opening 44 and an outlet opening 45.

The gas and electrode chambers are filled to the level indicated in Fig. 1, with coke or graphite which has been coated and/or impregnated with nickel nitrate or other suitable catalyst for the purpose.

The use of the apparatus for preparing carbon monoxide and hydrogen from mixtures of natural gas and air will now be described, it being assumed that the electrodes are energized and that the apparatus is otherwise functioning normally.

Natural gas, supplied by a gas compressor (not shown) is conducted to the chambers 24 of the tuyères by means of a conduit 50, a manifold 51, branch conduits 52 and inlets 44. This gas then passes upwardly through the openings 28 in one side of the web 27 and into the casings 21, in which the gases are preheated by heat transfer from the hot electrodes through the clamps 31 and 32 to the gas, the fins 35 providing a large surface for increasing the rate of heat transfer, and the flanges 33 directing the flow of gases to the top of the cylinder 21 on one side and down to the bottom of the cylinder at the other side. The gas thus preheated passes downwardly through the openings 28 in the other side of the web, into the tuyère chambers 25, and out of said tuyère chambers through outlets 45, conduits 53, manifold 54 and conduit 55, whence it is carried through a heater (not shown). In this manner the gas is brought up to the desired temperature and then, by means of conduits 56 and 57, is brought into the mixing chamber defined by the opening 16.

Portions of these conduits 56 and 57 extend through conduits 58 and 59 which are secured to the generator and communicate with said mixing chamber.

Air which has been preheated to the desired temperature is conducted by means of conduits 60 and 61 into the conduits 58 and 59 respectively, and thence into the mixing chamber defined by the opening 16 in the generator.

The heated natural gas and air then pass upwardly through the bed of coke or graphite which is coated with the catalyst, and as a result of the joint action of the catalyst and the heat supplied by the electrodes, are converted into carbon monoxide and hydrogen, which are drawn off through the outlet 8.

The preheating of the gas by the portions of the electrodes encased within the casings 21, by the principles of heat exchange, results in a simultaneous desired cooling of these portions of the electrodes. Since the bed of coke or graphite attains a temperature of about 2000° F., the electrodes become quite hot, and this heat is conserved to advantage by means of the heat exchanger which has been described.

The checkered brickwork 17 is highly effective in producing a thorough mixing of the gas and air prior to their passage through the generator.

It is to be particularly noted that the electrodes are arranged in such a manner as to be outside the main portion of the stream of gases passing through the generator. By this arrangement, no resistance is interposed by the electrodes to the passage of the gases through the generator, and at the same time, waste of heat by conduction of the heat of the generated gases to the electrodes is avoided.

It is to be further noted that the electrodes are arranged in such a manner that the path between the electrodes through the bed of coke or graphite is shorter at the bottom of the generator than at the top of the generator. By thus arranging the electrodes, the cooling effect of the relatively colder gas and air which are being introduced at the bottom of the generator, and which renders the lower portion of the coke or graphite column less conductive than the upper portion is compensated for by the decreased path through which the current travels at the lower portion of the column.

Figure 3:
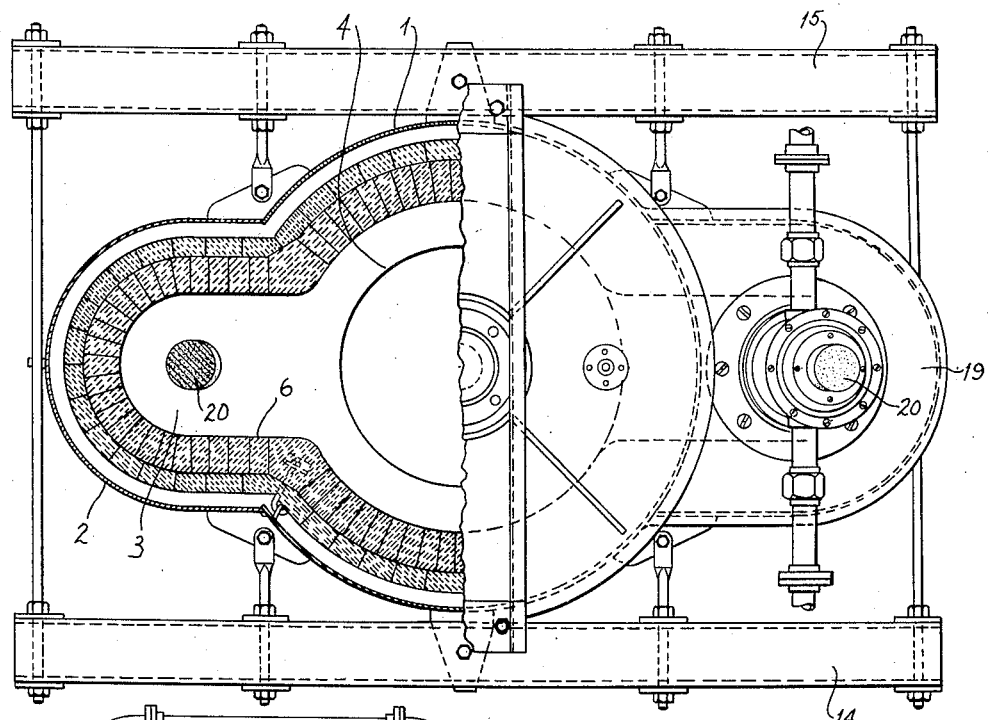
Fig. 3 is a view, partly in plan and partly in section, taken along the lines 3—3 of Fig. 1.
Figure 4:
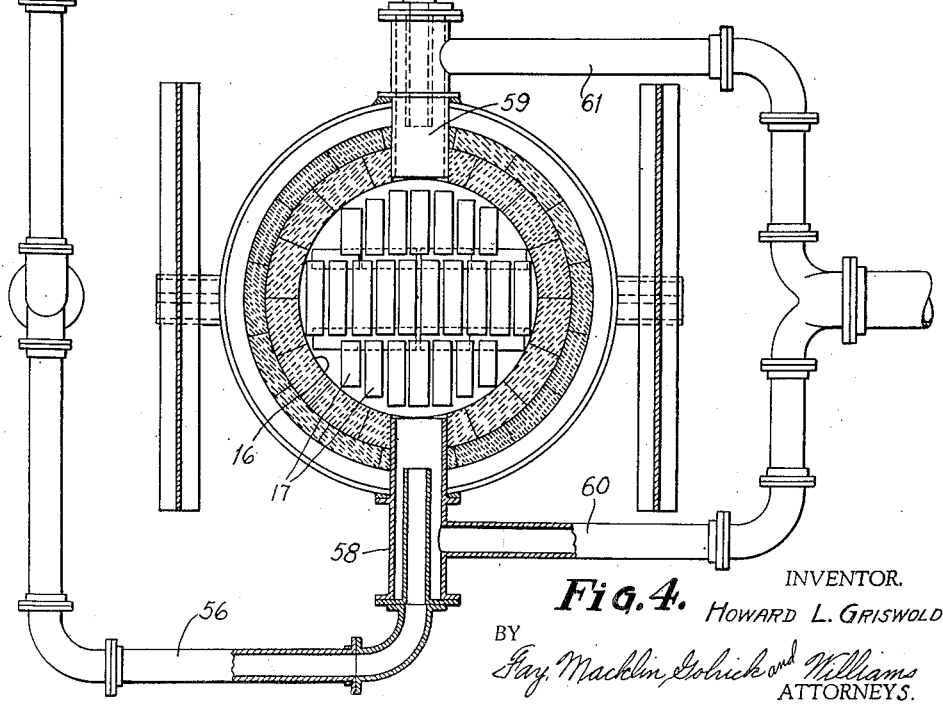
Fig. 4 is a cross-sectional view, taken along the line 4—4 of Fig. 1.
Figure 5:
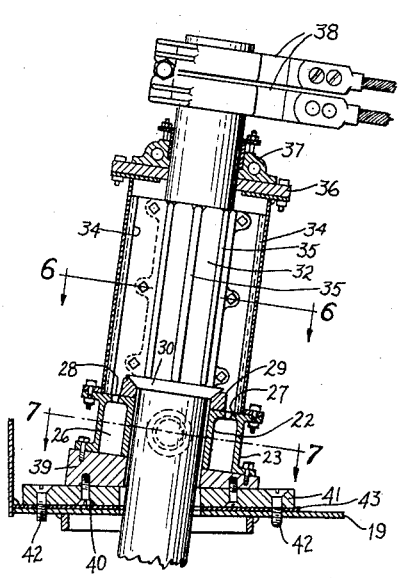
Fig. 5 is a vertical cross-sectional view of the upper portion of one of the electrodes and heat-exchanging means associated therewith.
Figure 6:
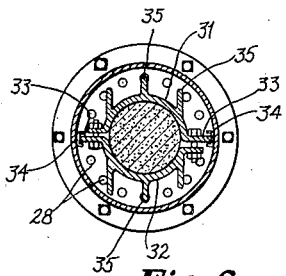
Fig. 6 is a cross-sectional view, taken on the line 6—6 of Fig. 5.
Figure 7:
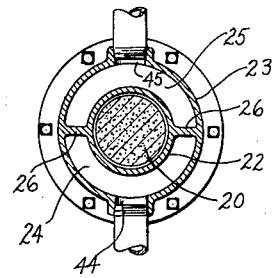
Fig. 7 is a cross-sectional view, taken on the line 7—7 of Fig. 5.

Thermo-couple wells, shown in Figs. 1 and 3, are also provided as a means of obtaining the temperature within the generator.

Refractory braces 100 (Figs. 1 and 2) are provided for the purpose of bracing the lower ends of the electrodes and preventing breakage of the electrodes by strains due to expansion and to poking.

It is to be noted that it is possible, and in some cases very desirable, to reverse the direction of the gas flow or to place the electrode terminals on the bottom rather than at the top of the shell. These changes are considered to be within the purview of the present invention.

Figure 8:
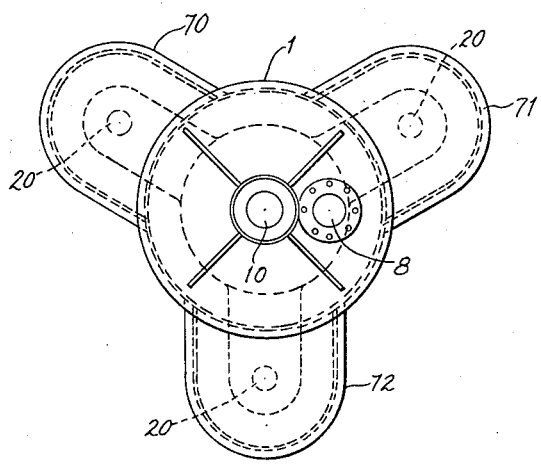
Fig. 8 is a plan view of a modified form of generator, embodying the invention.

In that form of the invention shown in Fig. 8, the general construction of the generator is the same as in Fig. 1, but the unit is designed for three phase current, and is accordingly provided with three wing chambers 70, 71 and 72, spaced apart at an angle of 120° from each other, and each provided with an electrode, as in the previously described form of the invention.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. A generator of the type described comprising a cylindrical body portion and wing chambers extending from said body portion and in communication with the latter, said wing chambers being of substantially semi-circular cross-section and electrodes in said chambers, said electrodes extending through said chambers at an inclination such that the lower ends of the electrodes are closer to each other than the upper ends.

2. A generator comprising a body of cylindrical cross-section, wing chambers extending from said body and defining electrode chambers communicating laterally with said body, said wing chambers being of substantially semi-circular cross-section, electrodes in said wings, and means for introducing gas and air into the lower end of said body.

3. A generator of the type comprising a cylindrical body portion and wing chambers extending laterally from said body portion and in communication with the latter, said wing chambers being of substantially semi-circular cross-section and having inclined outer walls, and electrodes in said chambers, said electrodes extending through said wing chambers at an inclination such that the lower ends of the electrodes are closer to each other than the upper ends.

4. A generator of the type described, comprising a cylindrical body portion and wing chambers disposed laterally of said body portion, said wing chambers being of substantially semi-circular cross-section and communicating laterally with the interior of said body portion, electrodes disposed in said chambers, said electrodes extending through said wing chambers at an inclination such that the lower ends of the electrodes are closer to each other than the upper ends, and means extending inwardly from the walls of the wing chambers and engaging the electrodes adjacent the lower ends of the latter for the purpose of bracing the same.

5. A generator of the type described comprising a body portion, and wing chambers extending from said body portion and communicating laterally with said body portion, each of said wing chambers being of smaller cross-sectional area than said body portion and being bounded by walls which are disposed angularly to the wall of said body portion at the vertical junction thereof with the wall of the body portion, and electrodes in said chambers, said electrodes extending through said wing chambers at an inclination such that the lower ends of the electrodes are closer to each other than the upper ends.

HOWARD L. GRISWOLD.